(12) United States Patent
Rao

(10) Patent No.: US 6,778,645 B1
(45) Date of Patent: Aug. 17, 2004

(54) METHOD AND APPARATUS FOR COORDINATING A POINT TO POINT DATA SESSION FROM AN EXISTING VOICE TELEPHONE CALL

(75) Inventor: Vijay M. Rao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/183,772

(22) Filed: Oct. 30, 1998

(51) Int. Cl.[7] .............................................. H04M 1/64
(52) U.S. Cl. ........................ 379/88.23; 379/93.21; 379/202.01; 370/352
(58) Field of Search ........................... 379/67.1, 93.01, 379/350, 100.15, 100.16, 93.05, 93.06, 93.07, 93.08, 93.09, 88.23, 88.24, 93.21, 202.01; 370/466, 352, 351, 260

(56) References Cited

U.S. PATENT DOCUMENTS

| | | | | |
|---|---|---|---|---|
| 5,493,609 A | * | 2/1996 | Winseck et al. | 379/93.08 |
| 5,796,742 A | * | 8/1998 | Klotzbach et al. | 370/466 |
| 5,850,436 A | * | 12/1998 | Rosen et al. | 379/350 |
| 5,898,761 A | * | 4/1999 | McHale et al. | 379/93.01 |
| 5,995,490 A | * | 11/1999 | Shaffer et al. | 370/260 |
| 6,091,721 A | * | 7/2000 | Greenberg et al. | 379/93.07 |
| 6,108,405 A | * | 8/2000 | Luong | 379/100.15 |
| 6,188,688 B1 | * | 2/2001 | Buskirk, Jr. | 370/352 |

OTHER PUBLICATIONS

Harry Newton, Newton's Telecom Dictionary, Mar. 1988, Flatiron Publishing, 14Th Updated Edition, pp. 557 and 643.*

Harry Newton, Newton's Telecom Dictionary, Mar. 1998, Flatiron Publishing, 14Th Updated Edition, pp. 557 and 643.*

* cited by examiner

Primary Examiner—Fan Tsang
Assistant Examiner—Gerald Gauthier
(74) Attorney, Agent, or Firm—Blakely, Sokoloff, Taylor & Zafman LLP

(57) ABSTRACT

A method for coordinating a point-to-point data session includes generating messages to a party at a first end of an existing voice telephone call. The messages instruct the party of what to do with a telephone. Instructions are transmitted to a modem at the first end to allow the modem to support the point-to-point data session on the existing voice telephone call.

28 Claims, 7 Drawing Sheets

METHOD AND APPARATUS FOR COORDINATING A POINT TO POINT DATA SESSION FROM AN EXISTING VOICE TELEPHONE CALL

FIELD OF THE INVENTION

The present invention relates to point-to-point video data sessions between parties on computer systems. More specifically, the present invention relates to a method and apparatus for coordinating the point-to-point data sessions from an existing voice telephone call between the parties.

BACKGROUND OF THE INVENTION

Data sessions between parties on computer systems, such as video conferencing, have become widely popular. Video conferencing allows two or more parties at remote sites to conduct a conference using a computer network to transmit audio, video, and other data. Each party utilizes a video camera, microphone, and speaker mounted on their computer. As one party speaks into the microphone and is positioned in front of the video camera, the party's voice and image is carried over the network and delivered to the other party's computer system.

Several types of computer networking techniques are available to support data sessions such as video conferencing. One computer network technique involves transmitting the audio, video, and other data of the video conference session via the Internet. Although Internet communication has become increasingly popular among businesses and provides a relatively inexpensive alternative to transmitting data from one location to another, Internet access is still not available to everyone and bandwidth on the Internet is not always guaranteed. A second computer network technique available to support data sessions involves transmitting data over a general switched telephone network (POTS). Although transmitting data point-to-point over a general switched telephone network provides less bandwidth compared to transmitting data over the Internet, the bandwidth is guaranteed.

In the past, in order to conduct a data session over a general switched telephone network, two telephone calls were typically required to establish the data session for parties using data modems. A first telephone call would be a voice call used to communicate the desire to conduct a data session. The second telephone call would be a call made by the data modems to establish the data session. Because data modems do not possess voice modem capabilities, the two telephone calls were required even though both calls were made on the same telephone lines. This proved to be inconvenient and time consuming.

SUMMARY

A method for coordinating a point-to-point data session is disclosed. Messages are generated to a party at a first end of an existing voice telephone call. The messages instruct the party of what to do with a telephone. Instructions are transmitted to a modem at the first end to allow the modem to support the point-to-point data session on the existing voice telephone call.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
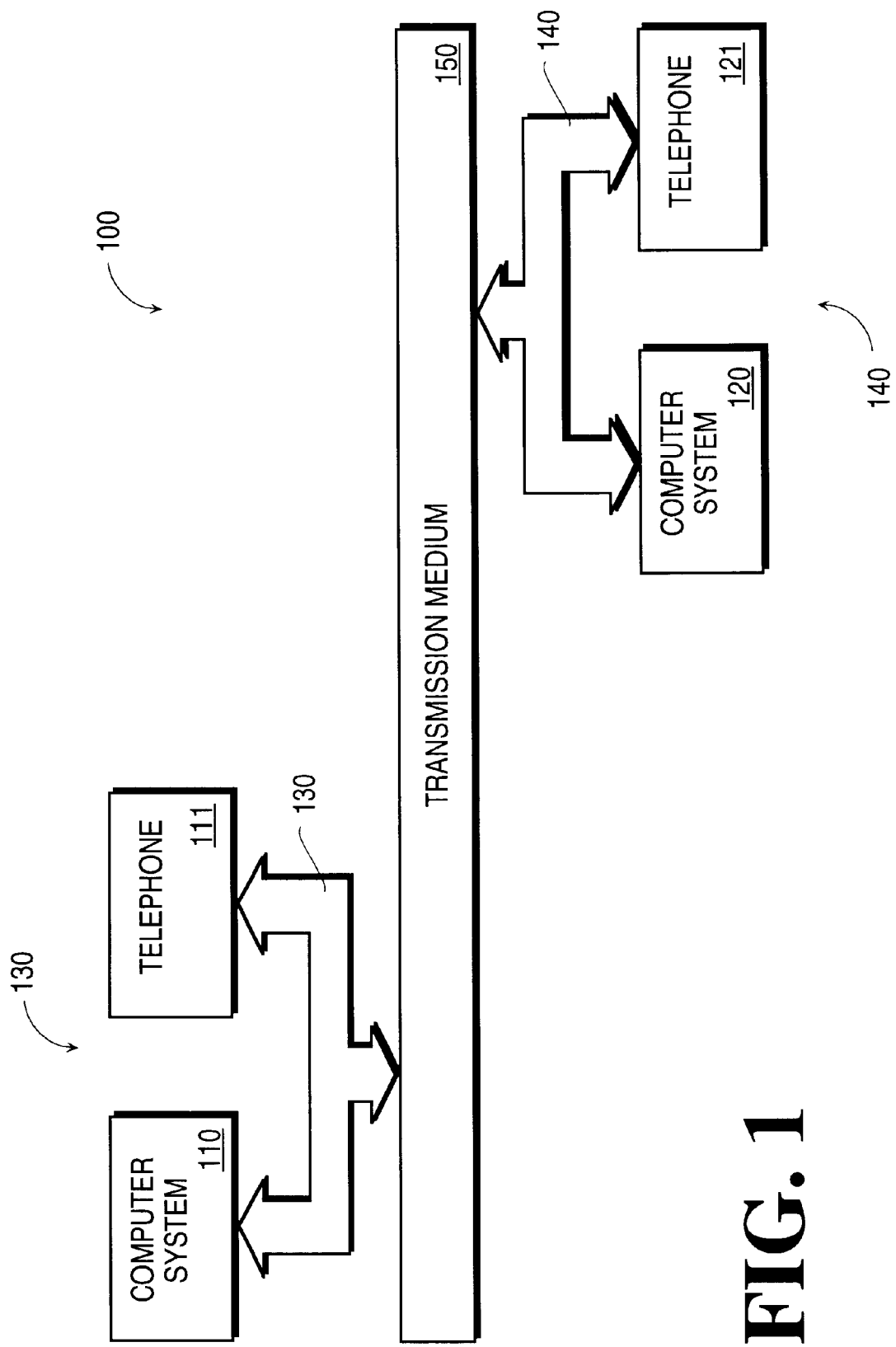
FIG. 1 is a block diagram of two computer systems connected together in a network connection according to an embodiment of the present invention.

FIG. 1 is a block diagram of a network 100 implementing an embodiment of the present invention. The network 100 includes a first computer system 110 at a first location 130 and a second computer system 120 at a second location 140. The first computer system 110 and the second computer system 120 may be connected together via a transmission medium 150. The first computer system 110 and the second computer system 120 may transmit data, such as video, audio, or other data, to each other via the transmission medium 150. The transmission medium 150 may be twisted pair wiring used in general switched telephone networks. The transmission medium 150 may be implemented to support a network connection for transmitting data between the first computer system 110 at the first location 130 and the second computer system 120 at the second location 140. The transmission medium 150 may also be used to support a voice telephone call between a first telephone 111 at the first location 130 and a second telephone 112 at the second location 140. The first telephone 111 and the first computer system 110 may be coupled in parallel to a single telephone line connection 130. The second telephone 121 and the second computer system 120 may be coupled in parallel to a single telephone line connection 140.

Figure 2:
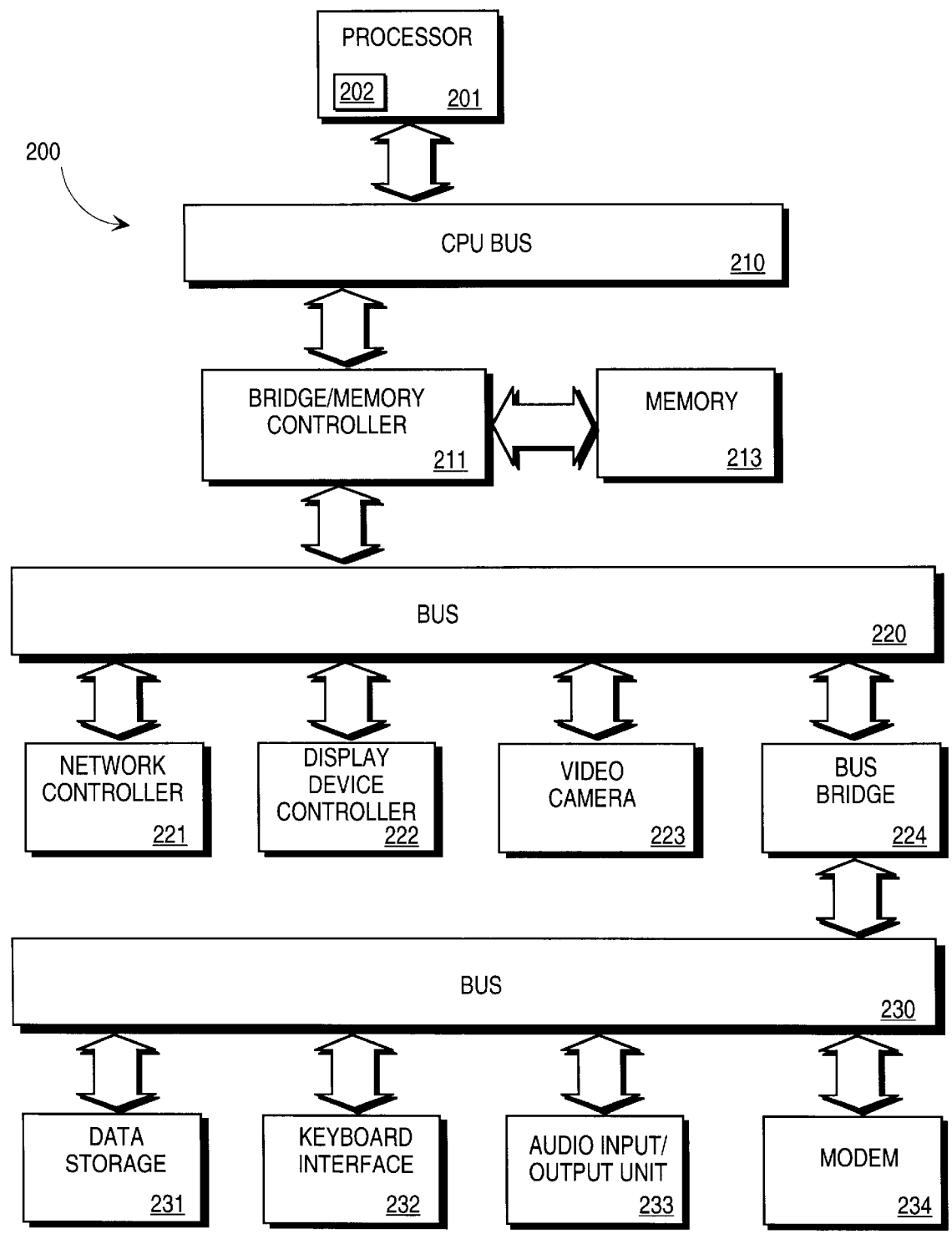
FIG. 2 is a block diagram of a computer system implementing an embodiment of the present invention.

FIG. 2 is a block diagram of a computer system 200 upon which an embodiment of the present invention can be implemented. The computer system 200 may be implemented as the first computer system 110 or the second computer system 120 shown in FIG. 1. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201.

A bridge/memory controller 211 is coupled to the CPU bus 210 and the memory 213. The bridge/memory controller 211 directs data signals between the processor 201, the memory 213, and other components in the computer system 200 and bridges the data signals between the CPU bus 210, the memory 213, and a first I/O bus 220.

The first input/output (I/O) bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video camera 223 is coupled to the first I/O bus 220. The video camera 223 operates to capture an image of an object. The video camera 223 may be a digital video camera having internal digital video capture hardware that translates the captured image into digital graphical data. The video camera 223 may be an analog video camera having digital video capture hardware external to the video camera 223 for digitizing the captured image.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio input/output unit 233 is coupled to the second I/O bus 230. The audio input/output unit 233 operates to support the recording and playing of sounds. The audio input/output unit 233 may include a microphone, speakers, and/or other audio input/output devices. A modem 234 is coupled to the bus 230. The modem 234 enables the computer system 200 to transmit data over telephone lines. Computer information is formatted digitally, whereas information transmitted over telephone lines are transmitted in the form of analog waves. The modem 234 modem converts the data between these two forms. The modem 234 may be a data modem.

A bus bridge 224 couples the first I/O bus 220 to the second I/O bus 230. The bus bridge 224 operates to buffer and bridge data signals between the first I/O bus 220 and the second I/O bus 230.

The present invention is related to the use of the computer system 200 to coordinate a point-to-point data session from an existing telephone call. According to one embodiment, coordinating a point-to-point data session is performed by the computer system 200 in response to the processor 201 executing a sequence of instructions in main memory 213. Such instructions may be read into memory 213 from another computer-readable medium, such as data storage device 231, or from another source via the network controller 221. Execution of the sequence of instructions causes the processor 201 to coordinate the point-to-point data session, as will be described hereafter. In an alternative embodiment, hardware circuitry may be used in place of or in combination with software instructions to implement the present invention. Thus, the present invention is not limited to any specific combination of hardware circuitry and software.

Figure 3:
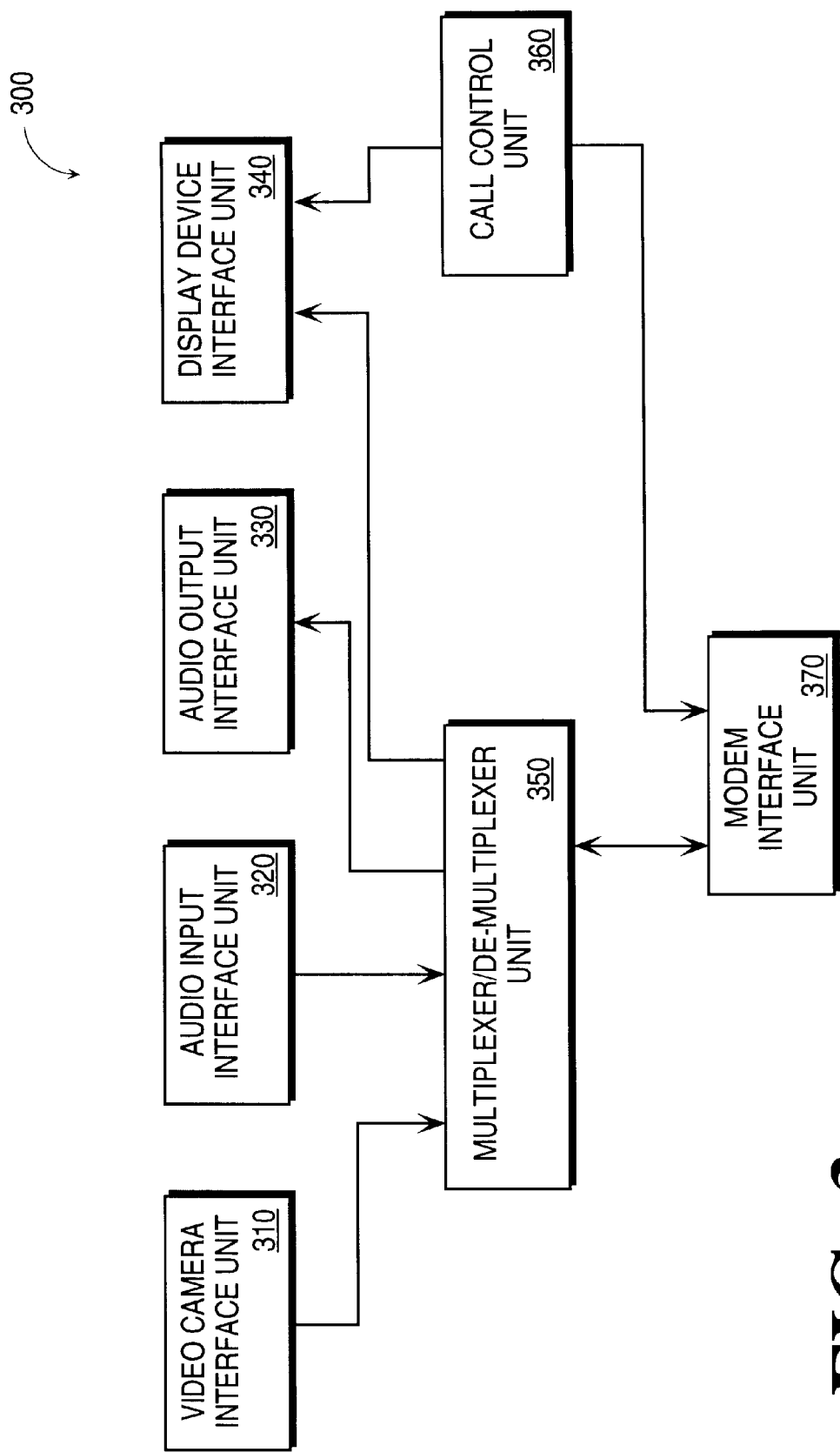
FIG. 3 is a block diagram of a video conferencing unit according to an embodiment of the present invention.

FIG. 3 is a block diagram of modules implementing a video conferencing unit 300 according to an embodiment of the present invention. In a preferred embodiment of the present invention, the modules are implemented in software and reside in main memory 213 (shown in FIG. 2) of the first computer system 110 (shown in FIG. 1) as sequences of instructions. It should be appreciated that the modules may be implemented by hardware as components coupled to the bus 220 (shown in FIG. 2) or a combination of both hardware and software. The video conferencing unit 300 includes a video camera interface unit 310. The video camera interface unit 310 interfaces with the video camera 223 (shown in FIG. 2) in the computer system 200 (shown in FIG. 2). The video camera interface unit 310 receives video data from the video camera 223. The video data may be, for example, digital graphical data. The video camera interface unit 310 performs a compression algorithm on the video data.

The video conferencing unit 300 also includes an audio input interface unit 320. The audio input interface unit 320 interfaces with the audio input/output unit 233 (shown in FIG. 2) of the computer system 200. The audio input interface unit 320 receives audio data from the audio input/output unit 233. The audio data may be, for example, digital audio data. The audio input interface unit 320 performs a compression algorithm on the audio data.

A multiplexer/demultiplexer unit 350 is coupled to the video camera interface unit 310 and the audio input interface unit 320. The multiplexer/demultiplexer unit 350 receives the compressed video data from the video camera interface unit 310 and the compressed audio data from the audio input interface unit 320. The multiplexer/demultiplexer unit 350 multiplexes the compressed video and audio data into multiplexed data. According to an embodiment of the video conferencing unit 310, the multiplexer/demultiplexer unit 350 multiplexes compressed video and audio data according to the H.324 Standard (International Telecommunication Union (ITU), published 1995).

A modem interface unit 370 is coupled to the multiplexer/demultiplexer unit 350. The modem interface unit 370 receives the multiplexed data from the multiplexer/demultiplexer unit 350. The modem interface unit 370 transmits the multiplexed data to the modem 234 (shown in FIG. 2) with instructions to send the multiplexed data to a remote party. The modem interface unit 370 also receives multiplexed data from the modem 234 sent from the remote party.

The multiplexer/demultiplexer unit 350 receives the multiplexed data sent from the remote party from the modem interface unit 370. The multiplexer/demultiplexer 350 demultiplexes the multiplexed data from the remote party to recover compressed video and audio data sent from the remote party. According to an embodiment of the video conferencing unit 310, the multiplexer/demultiplexer unit 350 demultiplexes multiplexed data according to the H.324 Standard.

An audio output interface unit 330 is coupled to the multiplexer/demultiplexer unit 330. The audio output interface unit 330 receives the compressed audio data sent from the remote party from the multiplexer/demultiplexer unit 350. The audio output interface 330 performs a decompression algorithm on the compressed audio data sent from the remote party to recover audio data sent from the remote party. The audio output interface 330 transmits the audio data sent from the remote party to the audio input/output unit 233 for playing.

A display device interface unit 340 is coupled to the multiplexer/demultiplexer unit 330. The display device interface unit 340 receives the compressed video data sent from the remote party from the multiplexer/demultiplexer unit 350. The display device interface unit 340 performs a decompression algorithm on the compressed video data sent from the remote party to recover video data sent from the remote party. The display device interface unit 340 transmits the video data sent from the remote party to the display device controller 222 (shown in FIG. 2) for displaying.

A call control unit 360 is coupled to the display device interface unit 340 and the modem interface unit 370. The call control unit 360 coordinates a point-to-point data session between the first computer system 110 (shown in FIG. 1) and the second computer system 120 (shown in FIG. 1) from an existing voice telephone call between the first telephone 111 (shown in FIG. 1) and the second telephone 121 (shown in FIG. 1). The call control unit 360 in the first computer system 110 generates messages to a first party at a first end of the existing voice telephone call via the display device interface unit 340. The messages instruct the first party of what to do with the first telephone 111. The call control unit 360 in the first computer system 110 also transmits instructions to a modem on the first computer system 110 via the modem interface 370 that allow the modem to support the point-to-point data session on the existing voice telephone call. The call control unit 360 in the second computer system 120 generates messages to a second party at a second end of the existing voice telephone call via the display device interface unit 340. The messages instruct the second party of what to do with the second telephone 112. The call control unit 360 in the second computer system 120 also transmits instructions to a modem on the second computer system 120 via the modem interface 370 that allow the modem to support the point-to-point data session on the existing voice telephone call.

It should be appreciated, that the present invention may be implemented for supporting a data session that transmits audio and video data as shown in FIG. 3, a data session that transmits either audio or video data only, or a data session that transmits other forms of data. The video camera interface 310, audio input interface unit 320, audio output interface unit 330, display device interface unit 340, multiplexer/demultiplexer unit 350, call control unit 360, and modem interface unit 370 may be implemented by using any known circuitry or technique. In an embodiment of the present invention where the video conferencing unit 300 is implemented in hardware, the video camera interface 310, audio input interface unit 320, audio output interface unit 330, display device interface unit 340, multiplexer/demultiplexer unit 350, call control unit 360, and modem interface unit 370 all reside on a single semiconductor substrate.

Figure 4:
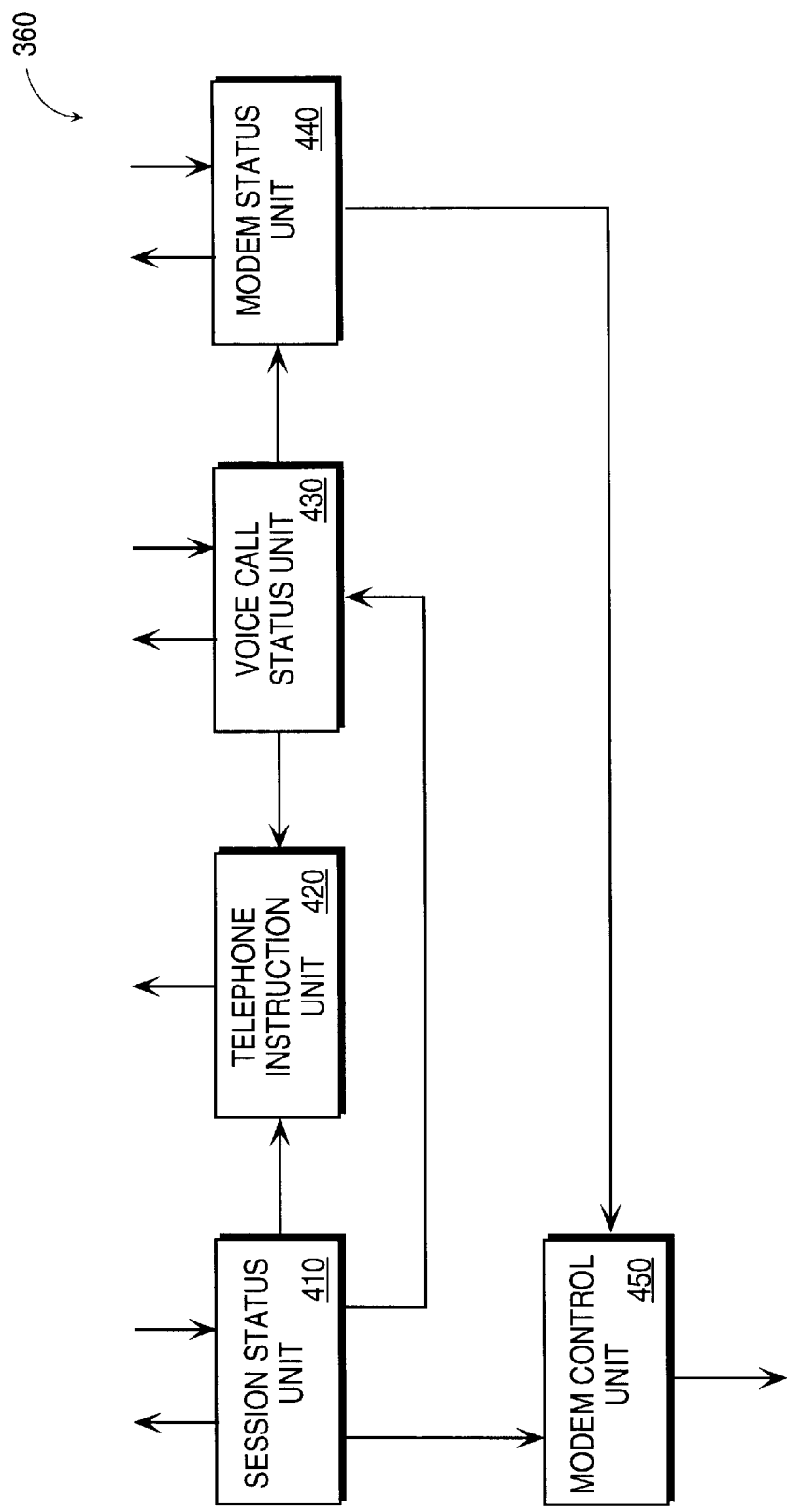
FIG. 4 is a block diagram of a call control unit according to an embodiment of the present invention.

FIG. 4 is a block diagram of a call control unit 360 (shown in FIG. 3) according to an embodiment of the present invention. The call control unit 360 includes a session status unit 410. The session status unit 410 generates a set of selectable messages that are transmitted to a display device on the computer system 200 (shown in FIG. 2) via the display device interface unit 340 (shown in FIG. 3) and the display device controller 222 (shown in FIG. 2). The set of selectable messages supports a user interface. Before a video conferencing session is started, the session status unit 410 generates a first session status selectable message that allows a party using the call control unit 360 to initiate a point-to-point video conferencing session and a second session status selectable message that allows the party to receive a point-to-point video conferencing session. When either the first or second session status selectable message is selected by the party using the call control unit 360 on their computer system, the session status unit 410 receives a signal indicating the session status selectable message that was selected. Upon receiving the signal that indicates that either the first or second session status selectable message that was selected, the session status unit 410 generates a third session status selectable message that allows the party to terminate the point-to-point video conferencing session. When the third session status selectable message is selected by the party using the call control unit 360, the session status unit 410 receives a signal indicating that the third session status selectable message was selected.

A modem control unit 450 is coupled to the session status unit 410. The modem control unit 450 controls the modem, 234 (shown in FIG. 2) by transmitting instructions or modem control signals to the modem 234. In response to receiving the signal indicating that either the first or second session status selectable message was selected from the session status unit 410, the modem control unit 450 transmits a first modem control signal to the modem 234 that takes the modem 234 off-hook. This allows the modem 234 to access its telephone line connection. If the signal indicates that the first session status selectable message was selected, the modem control unit 450 transmits a second modem control signal to the modem 234 that prompts the modem 234 to send a handshake initiation signal to a modem at the second end of the telephone call in which the existing voice telephone call was made. If the signal indicates that the second session status selectable message was selected, the modem control unit 450 transmits a third modem control signal to the modem 234 that prompts the modem 234 to monitor the telephone line connection for the handshake initiation signal. The handshake initiation signal may be, for example, a calling indicator and/or a capability request signal. Upon receiving the signal indicating that the third selectable session status signal was selected from the session status unit 410, the modem control unit 450 transmits a fourth modem control signal to the modem that prompts the modem 234 to terminates a carrier signal between itself and a remote modem.

A telephone instruction unit 420 is coupled to the session status unit 410. The telephone instruction unit 420 also receives the signal indicating that either the first or the session status selectable message was selected from the session status unit 410 but after the signal is transmitted to the modem control unit 450 and the modem 234 has been taken off-hook. The telephone instruction unit 420 generates a first telephone instruction message to the display device interface unit 340 (shown in FIG. 3) in response to receiving the signal from the session status unit 410. The first telephone instruction message instructs the party to hang-up the telephone. This allows the modem 234 to have exclusive access to the telephone line connection which allows it to transmit data over the telephone line connection.

A voice call status unit 430 is coupled to the session status unit 410. Upon receiving the signal indicating that the third selectable session status signal was selected from the session status unit 410, the voice call status unit 430 generates a first and second voice call status selectable messages that are transmitted to the display device interface unit 340 (shown in FIG. 3) that supports the user interface. When selected the first voice call status selectable message allows the user using the call control unit 360 to re-establish the voice telephone call between the first telephone 111 and the second telephone 121. When selected, the second voice call status selectable message allows the user to terminate the telephone call without reestablishing the voice telephone call. When either the first or second voice call status selectable message is selected from the party using the call control unit 360, the voice call status unit 430 receives a signal indicating which of the voice call status selectable messages was selected.

In response to receiving a signal indicating that the first voice call status selectable message was selected from the voice call status unit 430, the telephone instruction unit 420 generates a second telephone instruction message to the display device interface unit 340 in response to receiving the signal from the session status unit 410. The second telephone instruction message instructs the party to pick-up the telephone.

A modem status unit 440 is coupled to the voice call status unit 430. In response to receiving the signal indicating that the first voice call status selectable message was selected from the voice call status unit 430, the modem status unit 440 generates a modem status selectable message to the display device interface unit 420. When the modem status selectable message is selected or when the signal indicating that the second voice call status selectable message was selected is received from the voice call status unit 430, the modem status unit 440 prompts the modem control unit 450 to send a fifth modem control signal to the modem 234 that places the modem 234 back on-hook.

The session status unit 410, the telephone instruction unit 420, the voice call status unit 430, the modem status unit 440, and the modem control unit 450 may be implemented using any known circuitry or technique. In an embodiment of the present invention where the call control is implemented in hardware, the session status unit 410, the telephone instruction unit 420, the voice call status unit 430, the modem status unit 440, and the modem control unit 450 all reside on a single semiconductor substrate.

Figure 5:
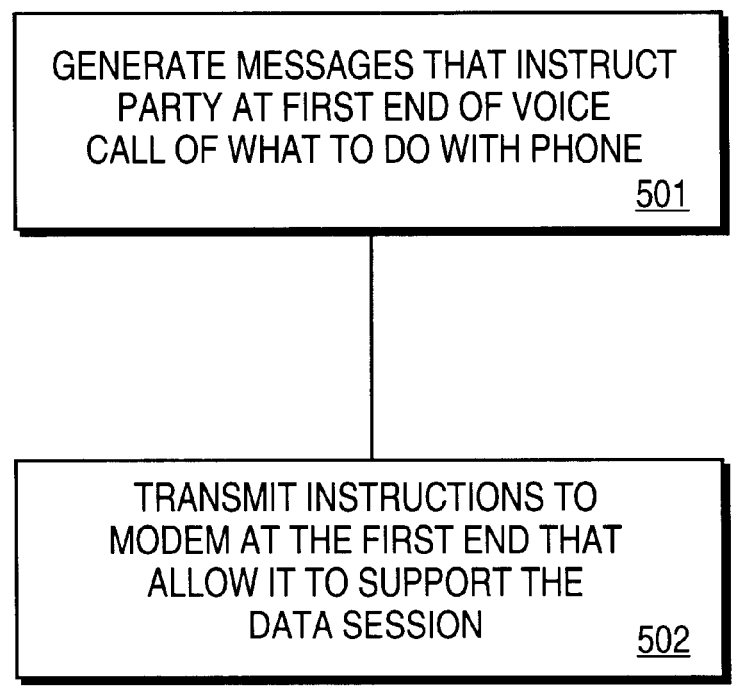
FIG. 5 is a flow chart illustrating a method for coordinating a point-to-point data session from an existing voice telephone call according to an embodiment of the present invention.

FIG. 5 illustrates a method for coordinating a point-to-point data session from an existing voice telephone call according to an embodiment of the present invention. At step 501, messages are generated to a party at a first end of an existing voice telephone call that instruct the party of what to do with a telephone.

At step 502, instructions are transmitted to a modem at the first end that allow the modem to support the point-to-point data session on the existing voice telephone call.

Figure 6A:
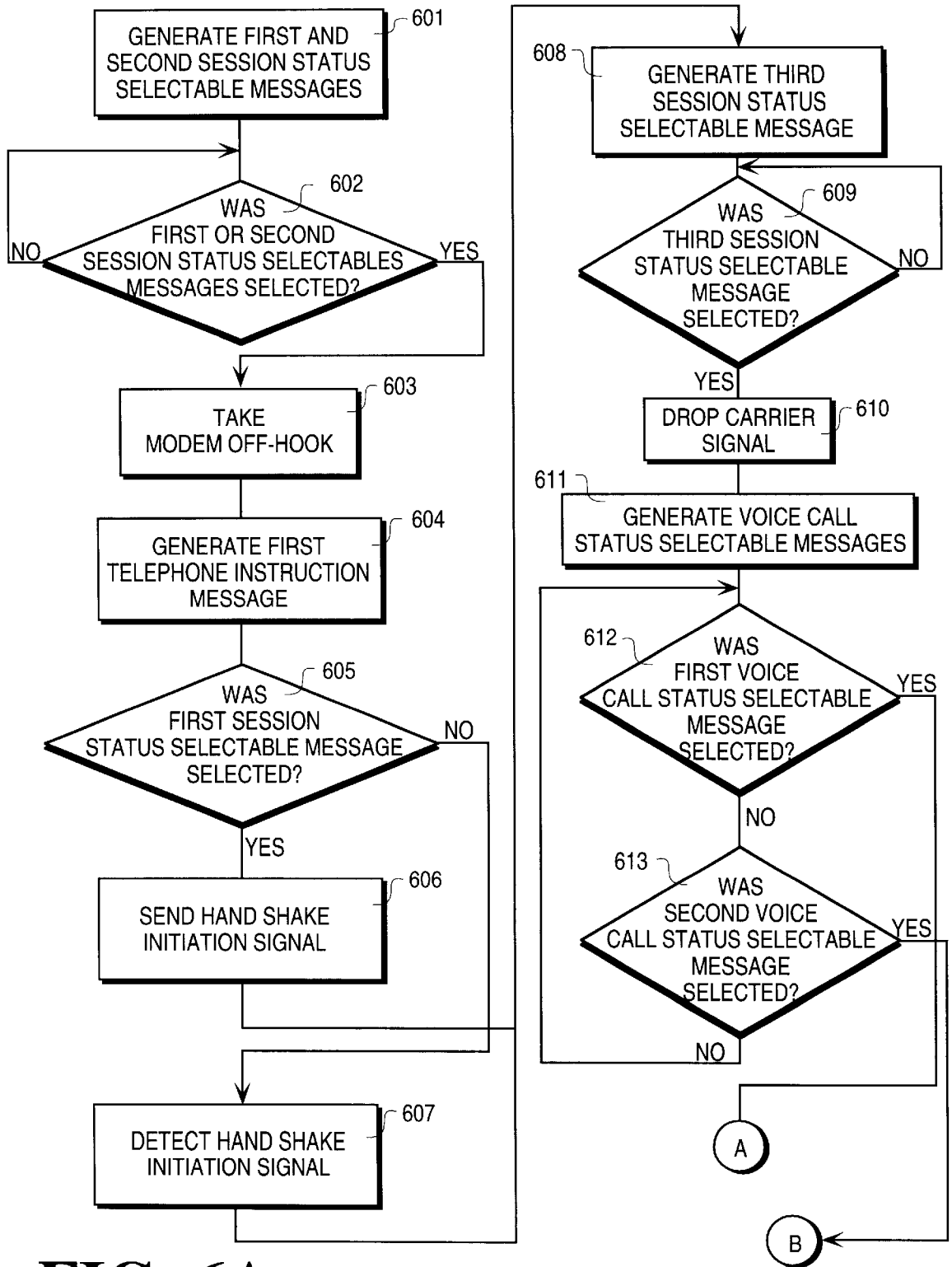
FIG. 6 is a flow chart illustrating a method for coordinating a point-to-point data session from an existing voice telephone call according to a second embodiment of the present invention.
Figure 6B:
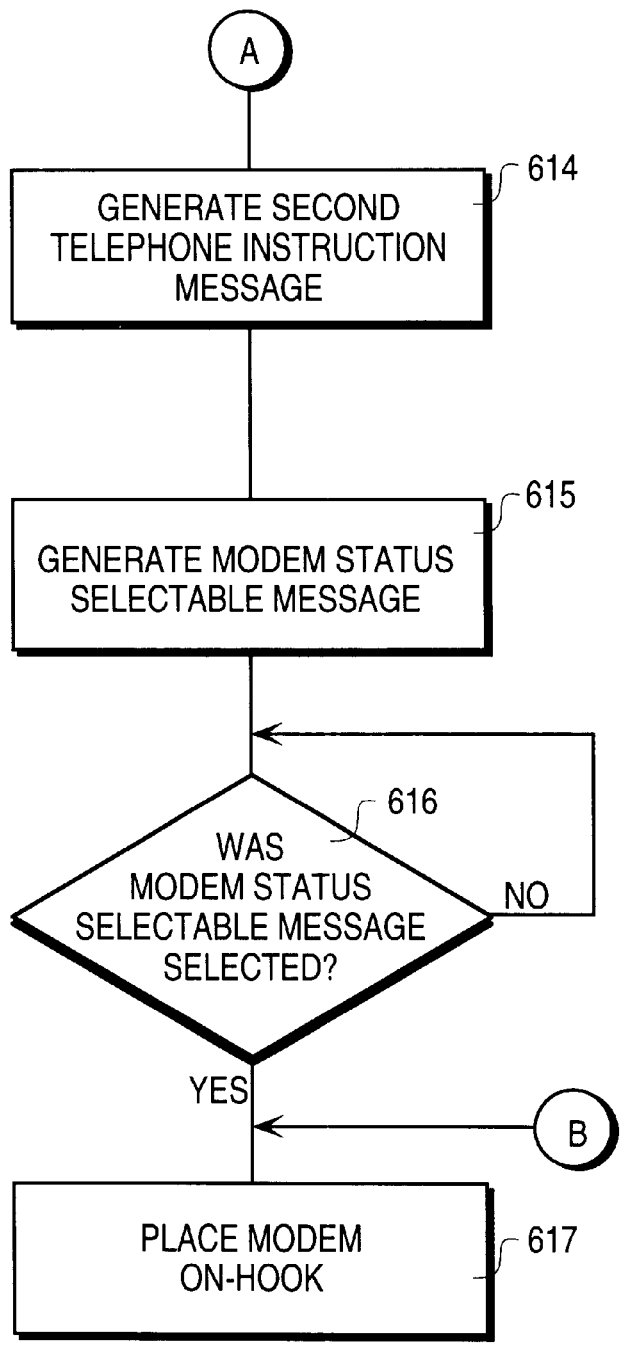

FIG. 6 illustrates a method for coordinating a point-to-point data session from an existing voice telephone call according to a second embodiment of the present invention. The point-to-point data session is coordinated between a first computer system at a first location and a second computer system at a second location from an existing voice telephone call established between a first telephone at the first location and a second telephone at the second location. At step 601, first and second session status selectable messages are generated. The messages are displayed on a display device of the first computer system at the first end to support a user interface. The session status selectable messages may be selected, for example, by using a cursor positioning device. The cursor positioning device may be a keyboard, mouse, finger pad, or other cursor positioning device. When the first session status selectable message is selected, a point-to-point data session is initiated by the first computer system. When the second session status selectable message is selected, the first computer system is put in a state that where it may receive a point-to-point data session that has been initiated by the second computer system.

At step 602, it is determined whether the first or second session status selectable message was selected. If either the first or second session status selectable message was selected, control proceeds to step 603. If neither the first nor second session status selectable message was selected, control returns to step 602.

At step 603, the modem of the first computer system that is connected to a telephone line with which the existing voice telephone call is on is taken off-hook. According to an embodiment of the present invention, a first modem control signal is transmitted to the modem that takes the modem off-hook.

At step 604, a first telephone instruction message is generated. The message is displayed on the display device of the first computer system to provide instruction to the party at the first location. The first telephone instruction message instructs the party to hang-up the first telephone.

At step 605, control determines whether the first session status selectable messages was selected. If the first session status selectable message was selected, control proceeds to step 606. If the second session status selectable message was not selected, control proceeds to step 607.

At step 606, a handshake initiation signal is sent from the modem of the first computer system to a modem of the second computer system. According to an embodiment of the present invention, a second modem control signal is transmitted to the modem of the first computer system that prompts the modem to send the handshake initiation signal to the modem of the second computer system. Control proceeds to step 608.

At step 607, the modem of the first computer system is placed in state where it monitors the telephone line and detects handshake initiation signals. According to an embodiment of the present invention, a third modem control signal is transmitted to the modem of the first computer system that prompts the modem to detect the hand shake initiation signal from a modem of the second computer system. It should be appreciated that the handshake initiation signals may be a calling indicator or capability request signal. Control proceeds to step 608.

At step 608, a third session status selectable message is generated. The third session status selectable message is displayed on the display device of the first computer system to support the user interface. When the third session status selectable message is selected, the data session is terminated.

At step 609, it is determined whether the third session status selectable message was selected. If the third session status selectable message was selected, control proceeds to step 610. If the third session status selectable message was not selected, control returns to step 609.

At step 610, the carrier signal between the modem of the first computer system and the modem of the second computer system is dropped. According to an embodiment of the present invention, a fourth modem control signal is transmitted to the modem of the first computer system that prompts the modem to terminate a modem session.

At step 611, first and second voice call status selectable messages are generated. The first and second voice call status selectable messages are displayed on the display device of the first computer system to support the user interface. When the first voice call status selectable message is selected, the voice telephone call between the first telephone and the second telephone is re-established. When the second voice call status selectable message is selected, the telephone call is terminated without re-establishing the voice telephone call.

At step 612, it is determined whether the first voice call status selectable message was selected. If the first voice call status selectable message was selected, control proceeds to step 614. If the first voice call status selectable message was not selected, control proceeds to step 613.

At step 613, it is determined whether the second voice call status selectable message was selected. If the second voice call status selectable message was selected, control proceeds to step 617. If the second voice call status selectable message was not selected, control returns to step 612.

At step 614, a second telephone instruction message is generated. The second telephone instruction message is displayed on the display device of the first computer system to provide instruction for the party at the first location. The second telephone instruction message instructs the party to pick-up the first telephone.

At step 615, a modem status selectable message is generated. The modem status selectable message is displayed on the display device of the first computer system to support the user interface. When the modem status selectable message is selected, the first modem is placed on-hook.

At step 616, it is determined whether the modem status selectable message was selected. If the modem status selectable message was selected, control proceeds to step 617. If the modem status selectable message was not selected, control returns to step 616.

At step 617, the modem is placed on-hook. According to an embodiment of the present invention, the modem of the first computer system receives a fifth modem control signal that places the modem on-hook.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than a restrictive sense.

What is claimed is:

1. A method for coordinating a videoconference session from an existing voice telephone call, comprising:

generating messages to a party at a first end of the existing voice telephone call to instruct the party of what to do with a telephone; and transmitting instructions to a modem at the first end to allow the modem to support the videoconference session with a session status unit on the existing voice telephone call.

2. The method of claim 1, wherein generating messages to the party at the first end comprises generating a message instructing the party to hang-up the phone after the modem is taken off-hook.

3. The method of claim 1, wherein transmitting instructions to the modem at the first end comprises transmitting a first instruction that takes the modem off-hook.

4. The method of claim 3, further comprising transmitting a second instruction that prompts the modem to send a handshake initiation signal to a modem at the second end of the existing voice telephone call.

5. The method of claim 4, wherein the handshake initiation signal is at least one of a calling indicator and a capability request signal.

6. The method of claim 1, further comprising transmitting a first instruction that prompts the modem to terminate a modem session in response to receiving a signal to stop the videoconference session.

7. The method of claim 6, further comprising transmitting a second instruction that places the modem on-hook.

8. The method of claim 1, further comprising generating a message instructing the party to pick-up the phone after a modem session has been terminated.

9. A computer-readable medium having stored thereon a sequence of instructions, the sequence of instructions including instructions which, when executed by a processor, causes the processor to coordinate a videoconference session from an existing voice telephone call with a data modem, the coordination comprising:

generating messages to a party at a first end of the existing voice telephone call to instruct the party of what to do with a telephone; and transmitting instructions to a modem at the first end to allow the modem to support the videoconference session with a session status unit on the existing voice telephone call.

10. The computer-readable medium of claim 9, wherein generating messages to the party at the first end comprises generating a message instructing the party to hang-up the phone after the modem is taken off-hook.

11. The computer-readable medium of claim 9, wherein transmitting instructions to the modem at the first end comprises transmitting a first instruction that takes the modem off-hook.

12. The computer-readable medium of claim 11, further comprising transmitting a second instruction that prompts the modem to send a handshake initiation signal to a modem at the second end of the existing voice telephone call.

13. The computer-readable medium of claim 12, wherein the handshake initiation signal is at least one of a calling indicator and a capability request signal.

14. The computer-readable medium of claim 9, further comprising instructions which when executed by the processor causes the processor to perform the steps of transmitting a first instruction that prompts the modem to terminate a modem session in response to receiving a signal to stop the videoconference session.

15. The computer-readable medium of claim 14 further comprising instructions which when executed by the processor causes the processor to perform the steps of transmitting a second instruction that places the modem on-hook.

16. The computer-readable medium of claim 9, further comprising instructions which when executed by the processor causes the processor to perform the steps of generating a message instructing the party to pick-up the phone after a modem session has been terminated.

17. A call control unit, comprising:

a user interface unit that generates messages to a party at a first end of an existing voice telephone call to instruct the party of what to do with a telephone; and a modem control unit, coupled to the user interface unit, that transmits instructions to a modem at the first end to allow the modem to support a videoconference session with a session status unit on the existing voice telephone call.

18. A computer system, comprising:

a bus;

a processor coupled to the bus;

a call control unit, coupled to the bus, including a user interface unit that generates messages to a party at a first end of an existing voice telephone call to instruct the party of what to do with a telephone, and a modem control unit, coupled to the user interface unit, that transmits instructions to a modem at the first end to allow the modem to support a videoconference session with a session status unit on the existing voice telephone call.

19. The call control unit of claim 17, wherein the user interface generates a message instructing the party at the first end to hang-up the phone after the modem is taken off-hook.

20. The call control of claim 17, wherein the modem control unit transmits a first instruction that takes the modem off-hook.

21. The computer system of claim 18, wherein the user interface generates a message instructing the party at the first end to hang-up the phone after the modem is taken off-hook.

22. The computer system of claim 18, wherein the modem control unit transmits a first instruction that takes the modem off-hook.

23. A method for coordinating a videoconference session from an existing voice telephone call, the method comprising the steps of:

a step for generating messages to a party at a first end of the existing voice telephone call to instruct the party of what to do with a telephone; and a step for transmitting instructions to a modem at the first end to allow the modem to support the videoconference session with a session status unit on the existing voice telephone call.

24. The method of claim 23, wherein the step for generating messages to the party at the first end comprises a step for generating a message instructing the party to hang-up the phone after the modem is taken off-hook.

25. The method of claim 23, wherein the step for transmitting instructions to the modem at the first end comprises a step for transmitting a first instruction that takes the modem off-hook.

26. The method of claim 25, further comprising a step for transmitting a second instruction that prompts the modem to send a handshake initiation signal to a modem at the second end of the existing voice telephone call.

27. A method for converting an existing telephone call into a videoconference session, the method comprising:

generating a message instructing a first party at a first end of the existing telephone call to hang-up a telephone after a modem is taken off-hook, wherein the modem does not support voice calls;

transmitting a first instruction to the modem that takes the modem off-hook;

transmitting a second instruction to the modem that prompts the modem to send a handshake initiation signal to a second modem at a second end of the existing voice telephone call; and establishing the videoconference session with a session status unit between the first and second modems.

28. The method of claim 27, further comprising:

transmitting a third instruction to the modem that prompts the modem to terminate a modem session in response to receiving a signal to stop the videoconference session;

terminating the videoconference session between the first and second modems; and reestablishing the existing telephone call.

* * * * *